United States Patent

Bosch

[15] 3,644,063
[45] Feb. 22, 1972

[54] REGULATED HYDRAULIC APPARATUS

[72] Inventor: Paul Bosch, Ludwigsburg, Germany

[73] Assignee: Robert Bosch G.m.b.H., Stuttgart, Germany

[22] Filed: Apr. 6, 1970

[21] Appl. No.: 25,701

[30] Foreign Application Priority Data

Apr. 5, 1965 Germany..................P 19 17 488.0

[52] U.S. Cl.................................417/213, 91/506
[51] Int. Cl.................................F04b 49/00
[58] Field of Search..........417/212, 213, 218, 222; 91/504–506; 60/52 VS

[56] References Cited

UNITED STATES PATENTS

| | | |
|---|---|---|
| 3,017,750 | 1/1962 | Kempson..............417/218 |
| 3,067,693 | 11/1962 | Lambeck..............417/218 |
| 3,495,536 | 2/1970 | Fahey..................417/218 |
| 2,284,897 | 6/1942 | Harrington...........417/213 |
| 2,845,876 | 8/1958 | Keel.....................417/222 |
| 2,892,312 | 6/1959 | Allen et al............60/52 VS |
| 2,892,311 | 6/1959 | Van Gerpen..........60/52 VS |
| 3,543,508 | 10/1968 | Schwab.................60/52 VS |

*Primary Examiner*—William L. Freeh
*Attorney*—Michael S. Striker

[57] ABSTRACT

A hydraulic machine, which may be a pump, or hydraulic motor is adjusted by a control device so that pressure fluctuations are compensated. When a pressure increase is so rapid that it cannot be corrected soon enough by the slowly operating control device, a regulating device is actuated by a pressure-responsive valve to directly connect the high- and low-pressure conduits of the machine so that the pressure drops immediately.

7 Claims, 1 Drawing Figure

PATENTED FEB 22 1972 3,644,063
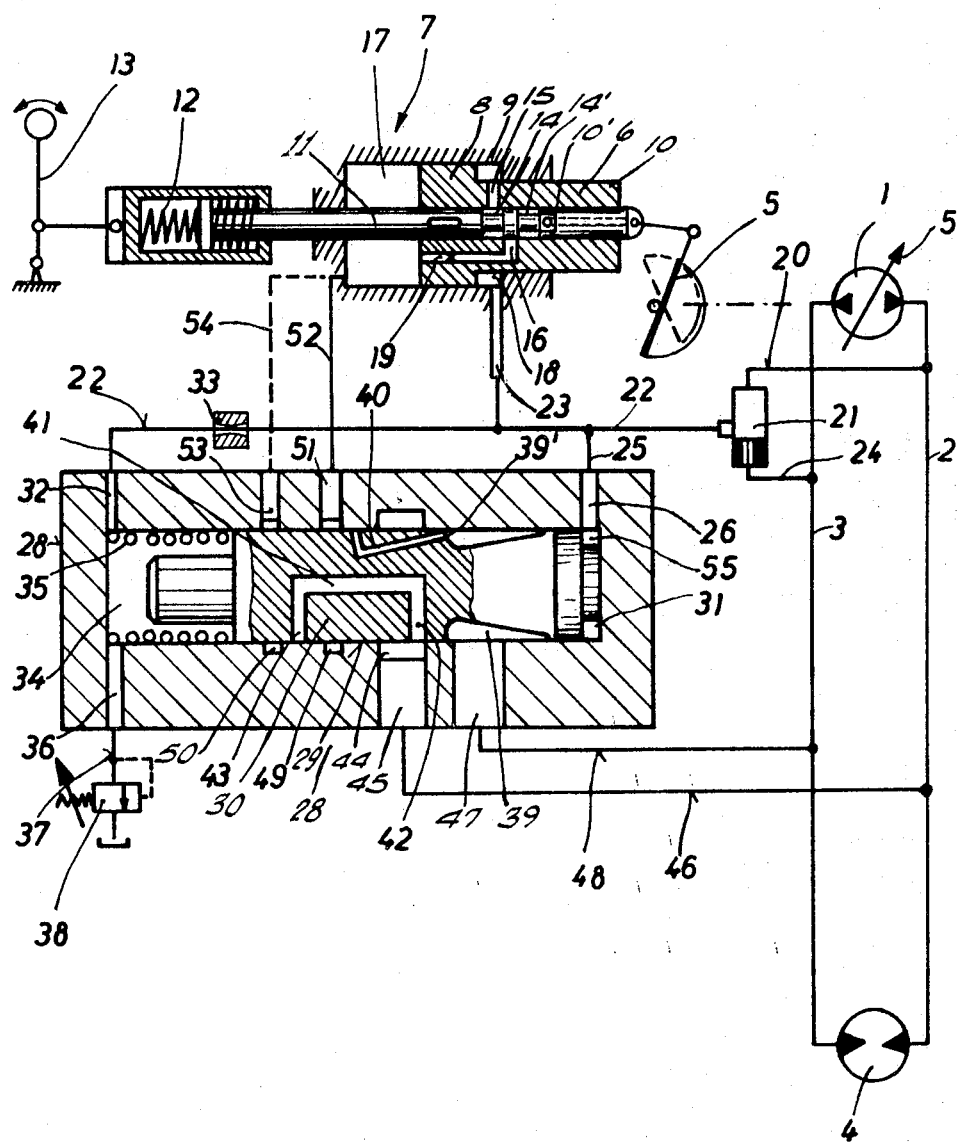
INVENTOR.
Paul BOSCH
BY
[signature]
Attorneys

3,644,063

REGULATED HYDRAULIC APPARATUS

BACKGROUND OF THE INVENTION

The present invention relates to a regulated hydraulic apparatus, and more particularly to control and regulating devices for adjusting the hydraulic pressure in a hydraulic machine, which may be a pump or motor. Apparatus of this type is disclosed in the British Pat. No. 1,084,210 according to which the circulating pressure of a hydraulic pump, of a hydraulic motor, or of a hydrostatic transmission is limited when a maximum pressure is reached or exceeded. When a hydraulic control device responds to the excessive pressure, the hydraulic machine is adjusted so that the pressure is reduced. The adjustment of the hydraulic machine to a normal pressure, prevents an overload on the prime mover of the hydraulic pump, for example on a combustion engine, which otherwise would stall. However, due to inertia of the control and regulating devices, the stroke and thereby the pressure of the hydraulic machine is not adjusted rapidly enough so that the combustion engine stalls before the adjustment has reduced the pressure to a normal value. In order to prevent such overloading of the combustion engine, pressure limiting safety valves must be provided, through which excess pressure is relieved. However, even if the pressure limiting valve opens for a short time, there is still the danger of overheating the pressure medium circulating in the hydraulic machine.

SUMMARY OF THE INVENTION

It is one object of the invention to provide a regulated hydraulic apparatus in which excess pressure is rapidly compensated and, overloading of the prime mover is prevented, even if the pressure increase takes place in a very short time, for example in 2 milliseconds.

Another object of the invention is to automatically connect the high- and low-pressure conduits of a hydraulic machine when the pressure of the medium in the same exceeds a predetermined maximum pressure.

Another object of the invention is to connect the high- and low-pressure conduits of the machine when the control device acts too slowly to reduce the pressure before a combustion engine driving the hydraulic machine stalls.

In accordance with the invention, a regulating device establishes direct communication between the high-pressure conduit and the low-pressure conduit of a hydraulic machine if the pressure of the medium therein rises rapidly beyond a predetermined maximum pressure.

It is an advantage of the invention, that inertia of the control and regulating device, has no detrimental effect on a rapid reduction of excess pressure which is rapidly reduced by shunting the hydraulic machine.

One embodiment of the invention comprises a hydraulic machine, such as a pump or motor having a high-pressure conduit and a low-pressure conduit, and including adjusting means for varying the pressure in the machine for example by varying the stroke of a machine piston; a hydraulic control device for operating the adjusting means and being hydraulically connected with the high-pressure conduit; a regulating device hydraulically connected with the high- and low-pressure conduits and including a normally closed pressure responsive valve hydraulically connected with the high-pressure conduit and moving to an open position at a predetermined maximum pressure, and a regulating means having a normal position, a first actuating position and a second actuating position, and being responsive to the movement of the valve to the open position to move from the normal position first to the first actuating position and then to the second actuating position.

In the first actuating position, the regulating device is hydraulically connected with the control device for actuating the same to operate the adjusting means to effect reduction of the pressure in the hydraulic machine and in the high-pressure conduit. In the second actuating position, the regulating device directly connects the high pressure conduit with the low-pressure conduit. The regulating means moves from the first actuating position to the second actuating position unless the predetermined pressure is reduced by the action of the control device before the regulating means arrives in the second actuating position. When the machine is hydraulically shunted in the second actuating position of the regulating means, the pressure in the high-pressure conduit is reduced rapidly. However, the regulating device arrives in the second actuating position only if the control device, actuated in the first actuating position of the regulating means, reacts too slowly to a rapid pressure increase.

In the preferred embodiment of the invention, the regulating device includes a cylinder, and a piston in the cylinder movable between the normal, and first and second actuating positions, and forming in the cylinder first and second end chambers. The first end chamber is directly connected with the high-pressure conduit, and the second end chamber is connected with the same through a throttle. A spring is provided in the second end chamber biasing the regulating piston to assume the normal position. The pressure responsive valve is connected with the second end chamber and reduces the pressure in the same when opening under excess pressure. The regulating piston then moves to the first and second actuating positions, reducing the volume of the second end chamber. The regulating cylinder has high- and low-pressure ducts, which are connected by a peripheral groove of the regulating piston in the second actuating position of the piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic, sectional and partly diagrammatical view illustrating an embodiment of the invention.

DESCRIPTION OF A PREFERRED EMBODIMENT

A pump 1, which may be an axial piston pump having adjusting means 5 for adjusting the stroke of the pistons and thereby the pressure of the pump, is connected by conduits 2 and 3 with a hydraulic motor 4. Pump 1 is driven by a prime mover, not shown, preferably a combustion engine. The arrangement may be reversed so that a hydraulic motor 1 is driven from a pump 4.

A control device 7 includes a stepped control piston 6 whose portion 8 of greater diameter is mounted within a large cylinder bore of a control cylinder 9 which has a smaller bore receiving the smaller piston portion 10. A linkage connects the free end of control piston 6 with the adjusting means 5 of pump 1, which is also shown as an arrow in the diagrammatic illustration of pump 1.

An axial bore 10′ in control piston 6 guides a valve slide 11 which is an elongated rod projecting out of control cylinder 8 and having at the free end thereof a flange located between two springs 12 in a closed casing connected by a linkage with the manually operated lever 13. Valve slide rod 11 has two annular peripheral grooves 14, 14′ which cooperate with a duct 9 which is connected with an annular control chamber 18 which communicates with a pressure conduit 22 through a duct 23. Another duct 16 communicates with a control chamber 17, on the other side of control piston 8, and contains a throttle 19 so that the pressure in chamber 17 is lower than the pressure in the annular control chamber 9 and in pressure conduit 23 which communicates with the high-pressure conduit 22.

It is assumed that the direction of rotation of pump 1 is selected so that conduit 2 is the high-pressure conduit, and conduit 3 is the low pressure conduit. Conduits 2 and 3 are respectively connected by conduits 20 and 24, with the ends of a shiftable valve 21 whose piston is urged by the pressure of conduit 20 to the illustrated position in which high pressure conduit 2 communicates through the cylinder of valve 21 with the high pressure conduit 22.

If the direction of rotation of pump 1 is reversed, and conduit 3 becomes the high pressure conduit, the pressure medium is pressed through conduit 24 into the cylinder of valve 21 and its piston is moved to the other end of the cylinder so that a high-pressure medium in conduit 3 flows through conduit 24 into conduit 22, which remains the high-pressure conduit, irrespective of the fact that conduit 3 is now the high-pressure conduit and conduit 2 is the low-pressure conduit. Depending on the direction in which pump 1 transports the pressure medium, either conduit 2 or conduit 3 is the high-pressure conduit, and the respective other conduit 2 or 3 is the low-pressure conduit. In any event, conduit 22 is always a high-pressure conduit which is connected by conduit 23 with the annular chamber 18 of the control device 7.

A regulating device has a cylinder means 28 consisting of two parts, and forming a closed space bounded by a cylindrical inner surface 29. A regulating piston 30 is slidably mounted in the cylinder bore and has at the right end, a stepped portion 55 which in the normal position shown in the drawing, forms in the cylinder means 28, an annular end chamber 31. At the other end of piston 30, another end chamber 34 is formed in which a spring 35 is located for biassing the piston 30 to the normal end position shown in the drawing. Cylinder means 28 has a bore 26 connected with a conduit 25 branching off high-pressure conduit 22, and connecting the same with the end chamber 31. Another bore 32 in cylinder means 28 connects the end chamber 34 with a portion of high-pressure conduit 22 in which the pressure is reduced by the action of a throttle 33 provided in conduit 22. Upon a pressure differential produced by the throttle 33 the pressure in end chamber 34 is lower than in end chamber 31, but in the illustrated normal position of the regulating device, spring 35 urges piston 30 to the right as viewed in the drawing, to a normal position abutting the end wall of cylinder means 28.

Cylinder means 28 has another duct 36 connected by conduit 37 with an adjustable pressure responsive valve 38 which automatically opens when the pressure in the same exceeds a predetermined maximum pressure to which the pressure responsive valve can be set.

The high-pressure conduit 2 is connected by a conduit 46 with a high-pressure duct 45, communicating with an annular groove 44 in cylinder means 28. The low-pressure conduit 3 is connected with conduit 48 to a low-pressure duct 47 in cylinder means 28 which communicates with an annular groove 39. A connecting conduit 40 communicates at one end with the annular groove 39, and has at its other end a port located on the outer peripheral surface of piston 30, and being closed by cylinder means 28 in the normal illustrated position of the regulating device.

A channel 41 in piston 30 has two radially extending channel portions 42, and 43, of which channel portion 42 communicates with the annular high-pressure chamber 44. When piston 30 is displaced, as will be described hereinafter, the channel portion 43 cooperates either with the annular chamber 49, or with the annular chamber 50 in cylinder means 28. Annular chambers 49 and 50 are connected by ducts 51 and 53, and conduits 52, 54, respectively, with control chamber 17 of the control device 7.

In the illustrated normal position of the regulating device, the high- and low-pressure ducts 45, 47, connecting duct 40, and ducts 51, and 53 are closed by piston 30.

OPERATION

It is assumed that pump 1 pumps a pressure medium a high pressure in the high-pressure conduit 2, while the return conduit 3 is a low-pressure conduit. The valve 21 prevents the flowing of the medium from conduits 2, 20, and 22 into the low-pressure conduit 3. The manual lever 13 is operated so that the valve slide rod 11 is displaced through the resilient connection 12 so that control piston 6 assumes a selected position in which adjusting means 5 adjust the stroke of the pump so that the desired high pressure prevails in the high-pressure conduit 2, 20, 22. The resilient connection 12 between slide valve rod 11, and manual lever 13 prevents movements of the manual lever 13 when control piston 6 and slide valve rod 11 are hydraulically displaced. High pressure medium flows from high-pressure conduit 22 through throttle 33 and duct 32 into end chamber 34, and through bore 26 into end chamber 31. Since the valve 38 closes duct 36 at the normal operational pressure, the pressure in chamber 34 is the same as the pressure in chamber 31, irrespective of the provision of throttle 33. Spring 35 holds piston 30 in its normal illustrated position, in which its stepped end portion 55 abuts the end face of cylinder means 28.

When the pressure generated by pump 1 exceeds the predetermined maximum pressure to which the pressure responsive valve 38 was adjusted, valve 38 opens, and pressure medium flows from high-pressure conduit 22 through throttle 33, bore 32, end chamber 34, and out of valve 38. The throttle 33 produces a pressure differential in high-pressure conduit 22, so that the pressure in end chamber 31 is greater than the pressure in the opened end chamber 34, and is sufficient to urge the piston 30 out of the illustrated normal position to a first actuating position, in which the open end of connecting conduit 40 registers with the annular groove 49, so that the control chamber 17 is connected with low pressure conduit 3, by conduit 48, low-pressure duct 42, annular groove 39, connecting conduit 40, annular groove 49, duct 51, and conduit 52. The pressure in control chamber 17 drops, and control piston 6 is displaced into the control chamber 17 by the pressure in control chamber 18. The flow of pressure medium from chamber 18 through throttle 19 in duct 16 is slow and delayed so that control piston 6 is shifted and displaces adjusting means 5 to set the pump 1 to a smaller piston stroke producing reduced pressure. Piston 6 is displaced until the pressures in high pressure conduit 2, and in end chamber 31 begin to drop, so that the pressure of spring 35 prevails to move regulating piston 30 slightly to the right and interrupts the communication between control chamber 17 through conduit 52, 51 with the displaced connecting conduit 40 until a new position of equilibrium is established in which control piston 6 and regulating piston 30 are in the normal position.

During the displacement of control piston 6 due to the opening of pressure responsive valve 38, the resilient connection 12 yields so that the manually operated lever 13 is not displaced.

If the pressure in high-pressure conduit 2 very rapidly rises to a predetermined maximum pressure, for example within a few milliseconds, the pressure in end chamber 34 rapidly increases, and the pressure responsive valve 38 opens so that the pressure medium flows out of the pressure chambers 31 and 34. As described above, the reduced pressure in chamber 34 permits movement of piston 30 against the action of spring 35 so that the low-pressure conduit means 3, 48, 47, are connected by groove 39 and connecting conduit 40, and through conduits 51, 52 with control chamber 17. Due to the inertia and slow operation of the adjusting means 5 controlled by piston 6, the stroke of pump 1 is not quickly enough adjusted so that the pressure does not momentarily drop, and the pressure differential between the end chamber 31 and the end chamber 34 continues to be sufficient to further displace regulating piston 30 to the left as viewed in the drawing until the left control edge 39' of groove 39 registers with the annular groove 44 which is connected by high-pressure duct 45 and conduit 46 with high-pressure conduit 2. Since the annular groove 39 is long enough in axial direction, it connects the high-pressure duct 45 with the low-pressure duct 47 so that high-pressure conduit 2 is connected with low-pressure conduit 3 in the regulating device, and pump 1 is shunted to a degree depending on the overlapping of annular groove 39, with the annular high-pressure groove 44 so that a further increase of the pressure is momentarily prevented.

Since connecting conduit 40 registers with groove 49 also in the above-described second actuating position of piston 30, control piston 6 continues its movement to the left and operates the adjusting means 5 to reduce the stroke of the axial piston pump 1 and thereby the pressure in high-pressure conduit 2. When the pressure has dropped, and the pressure responsive valve 38 closes, spring 35 moves piston 30 again to the right to the normal illustrated position, so that the communication between the high- and low-pressure ducts 45 and 47 is interrupted.

If the adjusting means 5 of pump 1 is not in the position illustrated in solid lines, but in the position shown in broken lines, and assuming the same direction of rotation of the pump 1, conduit 3 becomes the high-pressure conduit and conduit 2 becomes the low-pressure conduit. However, conduit 22 remains a high-pressure conduit since the piston of valve 21 is shifted to connect conduit 3, which is now the high-pressure conduit, with conduit 22.

When a predetermined maximum pressure occurs in the high pressure conduit means 3, 22, pressure responsive valve 38 opens, and piston 30 moves to the left. First, control chamber 17 is connected by connecting conduit 40 with the annular groove 39 and with duct 47 which now receives high-pressure medium from the high-pressure duct 3, 48. Due to the pressure increase in control chamber 17, control piston is shifted to the right so that pump 1 is adjusted to a smaller piston stroke until the pressure in high-pressure conduit 3 is reduced to the desired normal pressure.

If the direction of rotation of pump 1 is reversed, it is necessary to connect the control chamber 17 chamber 17 of control device 7 instead with the bore 51, with bore 53 which is effected by a conduit 54. Piston 30 assumes a position in which the bore 43 of duct 41 registers with the annular groove 50, and connects duct 45 and conduits 2, 46 with control chamber 17.

If, the pump 1 is used temporarily as a hydraulic motor, for example in a hydrostatic transmission, the regulating device 28, 30 effects an increase of the stroke of the hydraulic machine 1 which operates as a hydraulic motor, if a maximum pressure is reached. The increase of the piston stroke results in a reduction of the pressure.

It will be understood that each of the elements described above, or two or more together, may also find a useful application in other types of regulating apparatus for hydraulic machines, differing from the types described above.

While the invention has been illustrated and described as embodied in a regulating device for directly connecting the high-pressure conduit and low-pressure conduit of a pump upon a very rapid pressure increase, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Regulated hydraulic apparatus comprising, in combination, a hydraulic machine having a high-pressure conduit and a low-pressure conduit, and including adjusting means for varying the pressure in said machine; a hydraulic control device for operating said adjusting means and being hydraulically connected with said high-pressure conduit; and a regulating device hydraulically connected with said high- and low-pressure conduits and including a normally closed pressure responsive valve hydraulically connected with said high-pressure conduit and moving to an open position at a predetermined pressure in the same, said regulating device including a regulating cylinder means having a cylindrical inner bore, and being formed with a high-pressure duct connected with said high-pressure conduit and with a low-pressure duct connected with said low-pressure conduit, said high-pressure duct and said low-pressure duct having axially spaced ports at said cylindrical inner bore; said regulating device further including a regulating piston mounted in said cylinder bore for sliding in sealing contact between a normal position; a first actuating position in which said regulating device is hydraulically connected with said control device for actuating the same to operate said adjusting means to effect reduction of the pressure in said machine and in said high-pressure conduit, and a second actuating position, said regulating piston being formed with a groove communicating with said port of said high-pressure duct in said normal position, and communicating also with said port of said low-pressure conduit in said second actuating position whereby said high- and low-pressure ducts are directly connected, said regulating piston forming in said cylinder means first and second end chambers, said first end chamber being connected with said high pressure conduit, said regulating device including a throttle connecting said first end chamber and said high pressure conduit with said second end chamber, and means biassing said regulating piston to abut in said normal position said cylinder means in said first end chamber, said regulating piston being responsive to the movement of said pressure responsive valve to said open position to move from said normal position to said first actuating position so that said adjusting means is operated, and to move from said first actuating position to said second actuating position unless said predetermined pressure is reduced by the action of said control device before said regulating means arrives in said second actuating position so that said machine is hydraulically shunted and the pressure in said high-pressure conduit is rapidly reduced if said control device and adjusting means respond too slowly to a rapid pressure increase.

2. Apparatus as claimed in claim 1 wherein said control device includes manually operated means for setting said adjusting means to a selected position adjusting the stroke of said machine so that said machine operates at a desired pressure.

3. Apparatus as claimed in claim 1 wherein said pressure responsive valve is connected with said second end chamber and is responsive to the pressure in the same.

4. Apparatus as claimed in claim 1 wherein said biassing means includes a spring in said second end chamber abutting said regulating piston.

5. Apparatus as claimed in claim 1 wherein said control device includes a control cylinder and a control piston in said control cylinder forming first and second control chambers at opposite ends of said control cylinders, said first control chamber being connected with said high-pressure conduit; wherein said regulating piston is formed with a connecting duct having one end connected with said groove and the other end opening at the peripheral surface of said regulating piston spaced from said groove; wherein said regulating cylinder means is formed with at least one transverse bore opening at said inner bore thereof and being connected with said second control chamber, said other end of said connecting duct being spaced from said transverse bore in said normal position, and registering with the same in said first actuating position so that the pressure medium flows from said high pressure conduit into said second control chamber to cause operation of said adjusting means by said control device.

6. Apparatus as claimed in claim 5 wherein said regulating cylinder means is formed with another transverse bore connected with said second control chamber and registering with said other end of said connecting duct in another position of said regulating piston assumed when the flow of pressure medium is reversed in said machine, and said high-pressure duct becomes a low-pressure duct while said low-pressure duct becomes a high-pressure duct.

7. Apparatus as claimed in claim 5 wherein said control piston is formed with a central bore and with control ducts communicating with said control chambers and having ports at said central bore; and wherein said control device includes a valve slide in said central bore for opening and closing said control ducts, manually operated means, and resilient connecting means between said valve slide and said manually operated means so that said control piston and valve slide can move without displacing said manually operated means.

* * * * *